United States Patent

[11] 3,603,869

| [72] | Inventors | Ingemar Neuffer;<br>Dieter Eichmann; Frank Langweiler, all of Erlangen, Germany |
|---|---|---|
| [21] | Appl. No. | 37,563 |
| [22] | Filed | May 15, 1970 |
| [45] | Patented | Sept. 7, 1971 |
| [73] | Assignee | Siemens Aktiengesellschaft<br>Berlin and Munich, Germany |
| [32] | Priority | May 24, 1969 |
| [33] | | Germany |
| [31] | | P 19 26 628.5 |

[54] DEVICE FOR PRODUCING DIRECT VOLTAGE PROPORTIONAL TO SPEED
11 Claims, 4 Drawing Figs.

[52] U.S. Cl. .................................................. 322/31,
310/156, 310/198, 315/218, 322/90, 322/93,
322/94, 324/163
[51] Int. Cl. ...................................................... H02p 9/00
[50] Field of Search .......................................... 322/29, 31,
89, 90, 91, 93, 94; 310/152, 153, 156, 198;
315/218; 324/163, 165

[56] References Cited
UNITED STATES PATENTS

| 3,253,187 | 5/1966 | Short ............................ | 315/218 |
| 3,398,353 | 8/1968 | Noddin et al. ................ | 322/91 X |
| 3,405,347 | 10/1968 | Swift et al. ................... | 322/91 |

*Primary Examiner*—Oris L. Rader
*Assistant Examiner*—H. Huberfeld
*Attorneys*—Curt M. Avery, Arthur E. Wilfond, Herbert L. Lerner and Daniel J. Tick

ABSTRACT: A rotatable actuator is mounted on the rotor of an AC machine for rotation therewith. A pair of spaced transmitters are stationarily mounted on the stator of the AC machine in operative proximity with the actuator. Each of the transmitters produces an output signal during the time the actuator passes in close proximity therewith. A control unit couples the transmitters to the control electrodes of a plurality of electronic switches connected to the stationary windings of the machine and controls the conductive condition of the switches. Unipolar phase voltages are cyclically applied to a common output connected in common to the switches and provide a direct voltage proportional to the speed of the machine.

DEVICE FOR PRODUCING DIRECT VOLTAGE PROPORTIONAL TO SPEED

DESCRIPTION OF THE INVENTION

The invention relates to a device for producing a direct voltage. More particularly, the invention relates to a device for producing a direct voltage proportional to speed. The device of the invention utilizes an $n$-phase AC voltage machine having a rotatable inductor.

Brushless speed indicators are utilized for many drives wherein, due to specific conditions, no commutators or brushes may be considered for use, or wherein a speed indicator is free from maintenance requirements.

A speed indicator of known type utilizes a measuring generator which is a multiphase AC voltage machine having a rotary permanent magnet. The measuring generator cooperates with a control generator having a rotary permanent inductor. The permanent inductor of the control generator comprises half as many poles as the measuring generator. The output voltages of the control generator are supplied to a ring modulator diode circuit, so that the output voltages of the measuring generator are rectified with correct plurality. Elektroanzeiger, 21st year, No. 19, Oct. 2, 1968 pages 392 and 393.

A disadvantage of the aforedescribed type of speed indicator is that it is relatively expensive, due to the necessity of two machines. The measuring circuit also includes ring modulators, whose threshold voltages must be overcome by the measuring voltage. This results in considerable inaccuracies when low speeds are being measured, especially when the direction of the rotation is altered.

The principle object of the invention is to provide a new and improved device for producing a direct voltage proportional to speed.

An object of the invention is to provide a device for producing a direct voltage proportional to speed, which overcomes the disadvantage of the known device.

An object of the invention is to provide a device for producing a direct voltage proportional to speed, which provides accuracy in speed measurements, particularly at small speeds.

An object of the invention is to provide a device for producing a direct voltage proportional to speed, which is inexpensive in manufacturing operation and which functions with efficiency, precision, effectiveness and reliability.

In accordance with the invention, a rotary actuating member is provided for stationarily mounted transmitters which cooperate with electronic switches to cyclically connect unipolar phase voltages to a common output connection.

In accordance with the invention, a device for producing a direct voltage proportional to speed utilizing an $n$-phase AC voltage machine having a rotatable inductor and a plurality of stationary windings equiangularly spaced from each other and in operative proximity with the inductor, comprises a rotatable actuator mounted on the rotor shaft of the AC machine for rotation therewith. A pair of the transmitters is stationarily mounted on the stator of the AC machine in operative proximity with the rotatable actuator. Each of the transmitters produces an output signal during the time the actuator passes in close proximity therewith. Each of a plurality of electronic switches has an output, a control electrode and an input connected to a corresponding one of the stationary windings of the AC machine. Control means coupling the transmitters to the control electrodes of the switches controls the conductive condition of the switches in accordance with the output signals of the transmitters. Common output means is connected in common to the outputs of the switches whereby unipolar phase voltages are cyclically applied to the common output means and provide in the common output means a direct voltage proportional to the speed of the AC machine.

The AC machine may be a reluctance machine. The cyclical application of voltages occurs at least during the period $2n$ times the respective phase voltage half waves. The stationary windings are arranged and are spaced from the actuator by an airgap in a manner whereby the resultant induction curve produced by the windings alternately increases and decreases substantially linearly in accordance with the rotation of the rotor of the AC machine.

A plurality of spaced transmitters are stationarily mounted on the stator of the AC machine in operative proximity with the actuator and the actuator comprises a disc having a multitrack code design thereon, each of the code tracks being scannable by a corresponding one of the transmitters. The actuator may comprise a disc having a reflecting multitrack code.

The AC machine may be a four-phase AC voltage machine having four phase windings. The actuator may comprise a nonmetal disc having a metal strip thereon extending over a central angle of 180°. Each of the transmitters may comprise an inductive approach switch, the transmitters being displaced 90° from each other.

The control means comprises a pair of inverters each having an output and an input connected to a corresponding one of the inductive approach switches, and four AND gates each having an input connected to the output of an inverter and an output connected to the control electrode of a corresponding one of the electronic switches.

The common output means includes an amplifier having an input and a plurality of variable resistors each connected at one end in common to the input of the amplifier and at the other end to the output of a corresponding one of the electronic switches.

The control means provides a switch-off delay.

Two of the four phase windings of the AC machine are displaced 180° from each other and are connected in series in opposed polarities. The common output means includes a plurality of resistors and a difference amplifier having inputs connected to the series-connected phase windings via corresponding ones of the resistors and corresponding one of the electronic switches.

The connection of the unipolar phase voltages to the common output connection is preferably during at least $2n$ times the duration of the respective phase voltage half waves, in order to avoid voltage dips in the direct voltage to such common output connection.

The airgap between the rotary actuator and stationary windings and such windings are designed so that the resultant induction curve alternately increases and decreases substantially linearly in accordance with the rotation of the rotor of the AC machine, in order to produce an output voltage free from harmonics.

The cyclic connection of $n$-phase voltages would require $n$ different transmitters which must be induced by their corresponding actuator to respond during a corresponding turning angle of $2\pi/n$ of the rotor. A considerable reduction in the number of transmitters is possible, in accordance with the invention, if the actuator is a disc having a multitrack code pattern thereon, each track of which is scanned by a corresponding transmitter. In such arrangement, an arbitrary number of transmitters may be utilized to insure up to $2^a$ distinct rotor positions. Thus, for the connection of eight phase voltages, for example, only three transmitters would be required. It is thereby preferred to utilize a reflected code such as, for example, the Gray code, which reduces the error probability during the scanning process by the transmitters.

In order to compensate for asymmetries of the produced phase voltages, it is preferable to connect the gate circuits of the control circuit to an input of an amplifier via variable resistances and electronic switches.

By connecting two phase windings, in 180° electrical phase relation with each other, and connected in series with opposite polarities, to inputs of a difference amplifier, via a gate circuit and a resistor, optimum utilization of the voltage produced by the AC voltage machine is provided by the device of the invention. In this manner, the negative voltage half waves may be utilized to produce the direct voltage output.

It is preferable that the gate circuits, which control the connection of the phase voltages in sequence, operate overlappingly in a manner whereby the gate circuit which is controlled so that it is switched to its conductive condition is switched to its nonconductive condition only when the next-following gate circuit, which is to be in its conductive condition, has already been switched to its conductive condition. This provides increased protection against voltage dips. For this purpose, the gate circuit may be provided with a switch-off delay. Such a delay may comprise, for example, known time circuits such as, for example, monostable multivibrators.

An induction curve suitable for the production of a harmonic-free output voltage, which alternately increases or decreases linearly in accordance with the rotation of the rotor, may be provided in a particularly simple manner with a reluctance machine. A particularly preferred ratio between the flux in the transverse and longitudinal axes of the rotor is provided by utilizing an active rotor portion of sheet metal strips of cold-rolled, grain-oriented steel.

In order that the invention may be readily carried into effect, it will now be described with reference to the accompanying drawings, wherein.

In the figures, the same components are identified by the same reference numerals.

Figure 1:
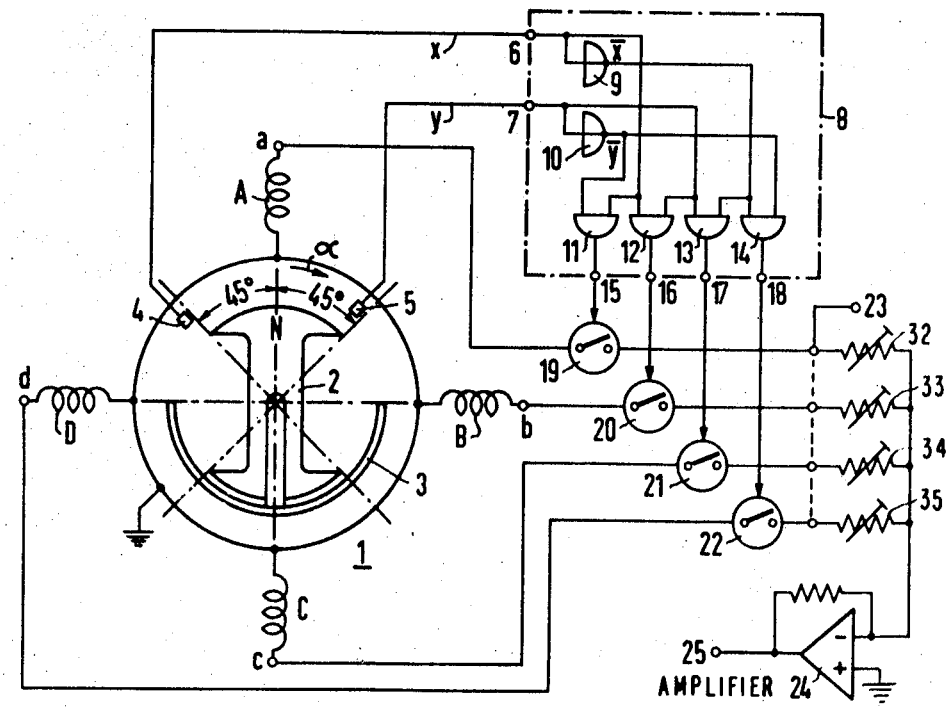
FIG. 1 is a circuit diagram of an embodiment of the device of the invention for producing a direct voltage proportional to speed.

FIG. 1 illustrates a four-phase AC voltage machine of the invention. Four phase windings A, B, C, D are provided. A rotatable inductor 2 comprises a permanent magnet and rotates in operative proximity with the four phase windings A, B, C, D. Four phase voltages, electrically displaced from each other by 90°, are provided between the corresponding end terminals $a$, $b$, $c$, $d$ of the four phase windings A, B, C, D, respectively, and the reference potential to which the other ends of said phase windings are connected (not shown in the FIGS.).

A metal bridge 3 rotates with the rotor shaft of the machine and has a circumference which extends for exactly 180° and is semicircular in configuration. Actually, the metal bridge 3 preferably comprises a metal band mounted on a nonmetal disc which is affixed to, and rotates with, the rotor shaft.

The metal bridge 3 functions to excite a pair of spaced inductive transmitters 4 and 5 which are stationarily mounted on the stator of the AC machine in operative proximity with the rotatable actuator 2. The transmitters 4 and 5 are displaced from each other by 90° and are in symmetry with the field axis of a phase winding. In the illustrated example of FIG. 1, transmitters 4 and 5 are in symmetry with the field axis of the phase winding A. The transmitters 4 and 5 may comprise any known inductive approach switches. Each inductive approach switch primarily comprises an electrical oscillator circuit which becomes detuned during the approach of a metallic object and, as a result, produces an output signal.

The outputs of the transmitters 4 and 5 are connected to input terminals 6 and 7, respectively, of a control circuit 8. The output signal $x$ of the transmitter 4 is thus supplied to the input terminal 6 and the output signal $y$ of the transmitter 5 is supplied to the input terminal 7. The control circuit 8 comprises two inverters 9 and 10 for converting input signals $x$ and $y$ into $\bar{x}$ and $\bar{y}$, respectively. Thus, if the signal $x$ represents a signal, the inverter 9 converts such a signal to no signal, and if the signal $x$ represents no signal, said inverter converts such a signal to a signal. Thus, the symbol "0" is converted by the inverter 9 or 10 to "1" and vice versa, in the usual manner of an The control circuit 8 further comprises four AND gates 11, 12, 13 and 14 which are connected in a specific manner to the input terminals 6 and 7 and inverters 9 and 10 of the control circuit. Thus, the AND gate 11 has one input connected to the output of the inverter 10 and another input connected in common with an input of the AND gate 12 to the input terminal 6. The AND gate 12 has another input connected in common with an input of the AND gate 13 to the input terminal 7. The AND gate 13 has another input connected in common with an input of the AND gate 14 to the output of the inverter 9. The other input of the AND gate 14 is connected to the output of the inverter 10 in common with the first-mentioned input of the AND gate 11.

Each of a plurality of electronic switches 19, 20, 21 and 22 has an input electrode, an output electrode and a control electrode. The output of the AND gate 11 is connected to the control electrode of the electronic switch 19 via an output terminal 15. The output of the AND gate 12 is connected to the control electrode of the electronic switch 20 via an output terminal 16. The output of the AND gate 13 is connected to the control electrode of the electronic switch 21 via an output terminal 17. The output of the AND gate 14 is connected to the control electrode of the electronic switch 22 via an output terminal 18.

The input electrode of the electronic switch 19 is connected to the end $a$ of the stationary switch A and the output electrode of said switch is connected to an input of an amplifier 24 via a variable resistor 32. The input electrode of the electronic switch 20 is connected to the end $b$ of the stationary winding B and the output of said switch is connected to the same input of the amplifier 24 via a variable resistor 33. The input electrode of the electronic switch 21 is connected to the end $c$ of the stationary winding C and the output electrode of said switch is connected to the same input of the amplifier 24 via a variable resistor 34. The input electrode of the electronic switch 22 is connected to the end $d$ of the stationary winding D and the output electrode of said switch is connected to the same input of the amplifier 24 via a variable resistor 35.

The electronic switches 19, 20, 21 and 22 are thus actuated or switched by the outputs 15, 16, 17 and 18 of the And gates 11, 12, 13 and 14, respectively, in accordance with the position of the rotor. A specific portion is removed from the individual phase voltages connected to a common output 24 and 25. The common output may comprise a common output connection 23 connected in common to the output electrodes of the switches 19, 20, 21 and 22 as indicated in broken lines in FIG. 1, or may comprise the amplifier 24 and the variable resistors 32, 33, 34 and 35. One input of the amplifier 24 is connected to a point at ground potential and the other input of said amplifier is connected in common to the variable resistors 32, 33, 34 and 35. A common output connection 25 is connected to the output of the amplifier 24. In order to avoid significant field distortion armature reactions, the common output connection 23 is only loaded weakly.

The inductor approach switches or transmitters 4 and 5 produce a binary "1" signal when the metal bridge 3 is located in their immediate vicinity. The binary "1" signal produced by the transmitter 4 is $x$ and the binary "1" signal produced by the transmitter 5 is $y$. When the metal bridge 3 is not in close proximity with the inductive transmitters 4 and 5, binary "0" signals are supplied to the input terminals 6 and 7 of the control circuit 8. When binary "0" signals are supplied to the input terminals 6 and 7, binary "1" signals $\bar{x}$ and $\bar{y}$ are produced by the inverters 9 and 10, respectively. Thus, in the embodiment of FIG. 1, the "1" signals of signal pairs $\bar{x}\bar{y}$, $x\bar{y}$, $xy$, and $\bar{x}y$ supplied to the AND gates 11, 12, 13 and 14 always appear in sequence exactly during the one-quarter rotation of the permanent inductor or actuator 2.

If the "1" signals at the output terminals 15, 16, 17 and 18 of the control circuit 8 are utilized to switch the electronic switches 19, 20, 21 and 22 to their conductive condition, then each phase voltage is active at the common output connection only for the duration of a quarter period. Since the connection fected in time symmetrically to the zero position of the flux through which the stator windings move, a direct voltage is provided at the output terminal 23 or at the output terminal 25, the magnitude of which direct voltage corresponds to the speed of rotation of the rotor of the AC machine and the polarity of which corresponds to the direction of rotation of said rotor.

Figure 2:
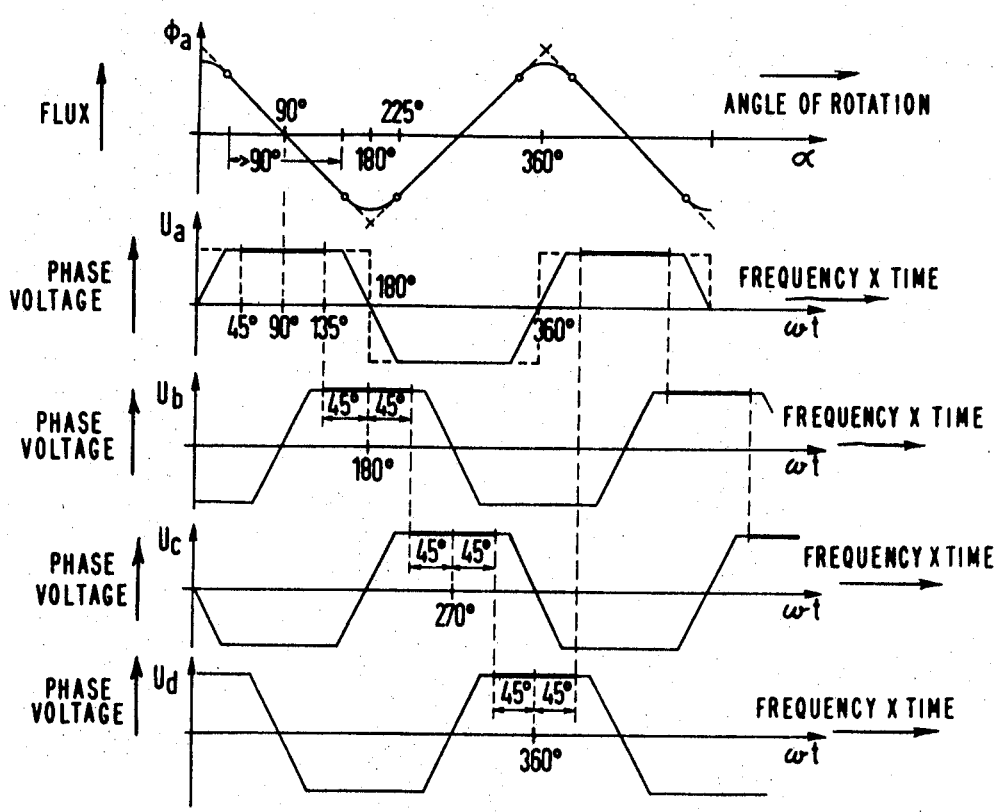
FIG. 2 is a graphical presentation of a plurality of voltage curves and a flux curve appearing in the embodiment of FIG. 1.

FIG. 2 shows a flux curve for the embodiment of FIG. 1 and four phase voltage curves for said embodiment. The curves illustrate the on and off switching points of the individual phase voltages. In the uppermost curve of FIG. 2, the abscissa represents the angle of rotation $\alpha$ and the ordinate represents the flux $\Phi_a$. The abscissa of each of the remaining four curves of FIG. 2 represents the frequency and time $\omega t$ and the ordinate represents the phase voltage. Thus, the second curve from the top is that of the phase voltage $U_a$ of the stator winding A, the third curve from the top is that of the phase voltage $U_b$ of the stator winding B, the second from the last curve is that of the phase voltage $U_c$ of the stator winding C, and the bottom curve of FIG. 2 is that of the phase voltage $U_d$ of the stator winding D.

The top curve of FIG. 2 illustrates the flux passing through the winding A when the inductor 2 is rotated about an angle $\alpha$. If the pole width, the airgap and the winding arrangement are appropriately designed, the flux may have an essentially triangular characteristic, as shown in FIG. 2, during the rotation of the inductor 2, in accordance with the angle of rotation $\alpha$ thereof. That is, the flux curve may be linearly decreasing to a value of $\alpha=180°$ and then linearly increasing to an angle of $\alpha=360°$.

The flux curve of FIG. 2 is the most preferable for providing a completely smooth output voltage, free of harmonics. Since the embodiment of FIG. 1 provides a connection to the common output during an angular range of 90°, it suffices that the flux curve varies linearly only during such an angular range. This results in the phase voltages $U_a$, $U_b$, $U_c$ and $U_d$ of FIG. 2. If a start is made at the position of the inductor 2 shown in FIG. 1, a "1" signal occurs at an angle of rotation of 45°, at the input terminal 6 of the control circuit 8 and at the output of the inverter 10. A "1" signal is provided at the output terminal 15 of the AND gate 11 of the control circuit 8 and actuates the electronic switch 19 to its on condition. When the electronic switch 19 is closed, it applied the phase voltage $U_a$ of the stator winding A, from then on, to the common output terminal 23 or 25. The phase voltage $U_a$ is applied to the common output terminal 23 or 25 until such time that the north pole N of the inductor 2 rotates through an angle of rotation $\alpha$ of 135°, with respect to the field axis of the stator winding A. During such time, the transmitter 5 also responds due to the metal strip 3.

The output signal $x$ of the transmitter 4, and the output signal $y$ of the transmitter 5, is then each a "1" signal, so that the electronic switch 20 is closed via the AND gate 12 and its output terminal 16 and the electronic switch 19 is simultaneously opened via the AND gate 11 and its output terminal 15. As shown in FIG. 2, with regard to FIG. 1, the control of the electronic switches 19, 20, 21 and 22 continues cyclically with regard to the other phase voltages $U_b$, $U_c$ and $U_d$. It is also obvious that the combination of removed unipolar voltage half waves results in a completely smooth output voltage having a magnitude which corresponds to the speed of the rotor and a polarity which corresponds to the direction of rotation of the rotor.

Figure 3:
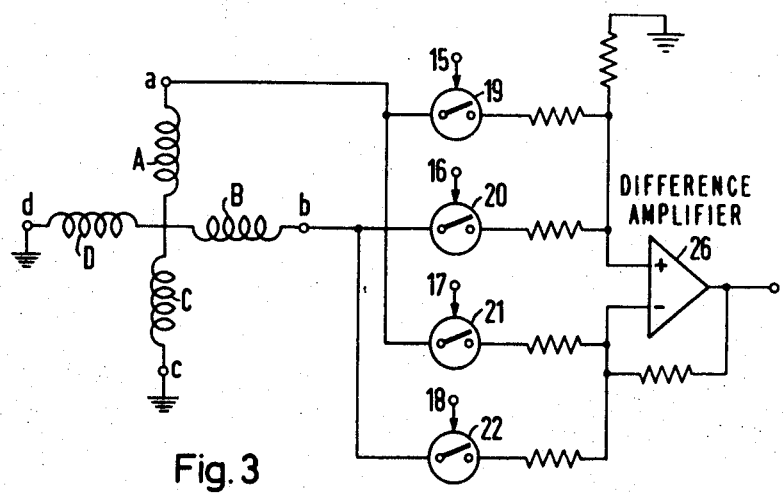
FIG. 3 is a circuit diagram of another embodiment of part of the device of the invention for producing a direct voltage proportional to speed.

FIG. 3 illustrates another embodiment of the device of the invention for producing a direct voltage proportional to speed. In the embodiment of FIG. 3, with the assistance of externally controlled two-way rectification, all half waves of the alternating phase voltage produced by the AC machine may be utilized to measure the rotor speed. In the embodiment of FIG. 3, two phase windings, mutually displaced by 180°, are connected in series with each other, with opposite polarities, so that their voltages are added. The arrangement of the phase windings A, B, C and D corresponds to the arrangement of the windings of FIG. 1.

The phase windings A and C are connected in series with each other. The end $a$ of the phase winding A is connected via the electronic switch 19 to the positive input of a difference amplifier 26, and via the electronic switch 21 to the negative input of said difference amplifier. The phase windings B and D are connected in series with each other. The end $b$ of the phase winding B is connected via the electronic switch 20 to the positive input of the difference amplifier 26, and via the electronic switch 22 to the negative input of said difference amplifier.

The difference amplifier 26 comprises any suitable known difference amplifier and functions, in a known manner, as an adding and subtracting calculating amplifier. The electronic switches 19, 20, 21 and 22 of the embodiment of FIG. 3 are controlled in their conductive condition in the same manner as in the embodiment of FIG. 1, by the output signals at the output terminals 15, 16, 17 and 18, respectively, of the control circuit (FIG. 1).

As shown in FIG. 2, the double amplitude magnitude of a phase voltage acts in the embodiment of FIG. 3 upon the common output. This is due to the series connection of the two phase windings A and C and the series connection of the two phase windings B and D. Furthermore, each phase voltage in the embodiment of FIG. 3 utilizes its negative half wave at the correct polarity.

Figure 4:
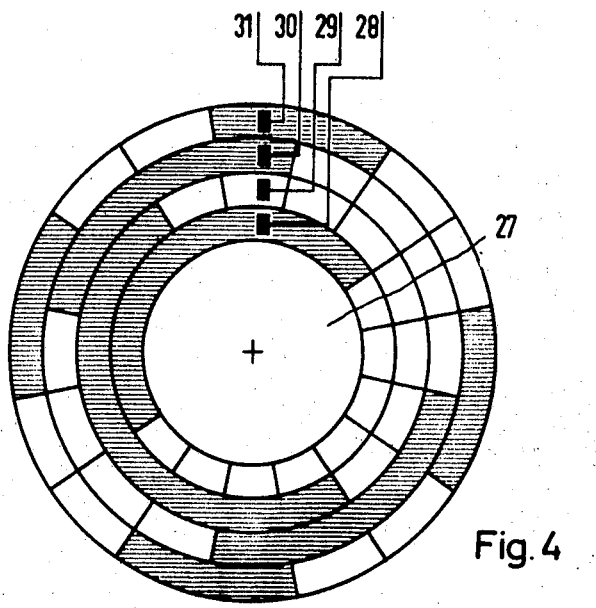
FIG. 4 is a schematic diagram of an embodiment of an actuator of the device of the invention for producing a direct voltage proportional to speed.

FIG. 4 illustrates an embodiment of an actuator which may be utilized as the actuator for a 16-phase alternating voltage machine. The actuator of the embodiment of FIG. 4 comprises a disc 27 which is affixed to and rotates with the rotor of the AC voltage machine. Four concentric code tracks are provided on the surface of the disc 27 in accordance with the Gray code. A plurality of transmitters 28, 29, 30 and 31 are stationarily mounted on the stator. The transmitter 28 is mounted in operative proximity with, and scans, the innermost code track. The transmitter 29 is mounted in operative proximity with, and scans, the next to the innermost code track. The transmitter 30 is mounted in operative proximity with, and scans, the next to the outermost code track. The transmitter 31 is mounted in operative proximity with, and scans, the outermost code track.

The signals which are produced at the outputs of the transmitters 28, 29, 30 and 31 are utilized to differentiate, in a known manner, between 16 distinct rotor positions. In an eight- or four-phase AC voltage machine, only the three or two innermost code tracks, and thus only three or two transmitters, would be necessary. Generally, the number of transmitters, and thus the number of required code tracks, is derived in the embodiment of FIG. 4 of the actuator, from the logarithm of the number of phases $n$ relative to the base 2. If, during an attempt to determine the required number of transmitters, a number is derived between two whole numbers, the larger of such two numbers will be utilized. The code design for $n$ sequential transmitter signal combinations is extended uniformly over the entire periphery of the disc.

While the invention has been described by means of specific examples and in specific embodiments, we do not wish to be limited thereto, for obvious modifications will occur to those skilled in the art without departing from the spirit and scope of the invention.

We claim:

1. A device for producing a direct voltage proportional to speed utilizing an $n$-phase AC voltage machine having a rotatable inductor and a plurality of stationary windings equiangularly spaced from each other and in operative proximity with said inductor, said device comprising a rotatable actuator mounted on the rotor shaft of the AC machine for rotation therewith;

a pair of spaced transmitters stationarily mounted on the stator of the AC machine in operative proximity with said rotatable actuator, each of said transmitters producing an output signal during the time said actuator passes in close proximity therewith;

a plurality of electronic switches each having an output, a control electrode and an input connected to a corresponding one of the stationary windings of the AC machine;

control means coupling said transmitters to the control electrodes of said switches for controlling the conductive condition of said switches in accordance with the output signals of said transmitters; and common output means connected in common to the outputs of said switches whereby unipolar phase voltages are cyclically applied to said common output means and provide in said common output means a direct voltage proportional to the speed of the AC machine.

2. A device as claimed in claim 1, wherein the AC machine is a reluctance machine.

3. A device as claimed in claim 1, wherein the cyclical application of voltages occurs at least during the period $2n$ times the respective phase voltage half waves.

4. A device as claimed in claim 1, wherein said stationary windings are arranged and are spaced from said actuator by an airgap in a manner whereby the resultant induction curve produced by said windings alternately increases and decreases substantially linearly in accordance with the rotation of the rotor of the AC machine.

5. A device as claimed in claim 1, further comprising a plurality of spaced transmitters stationarily mounted on the stator of the AC machine in operative proximity with said actuator and wherein said actuator comprises a disc having a multitrack code design thereon, each of the code tracks being scannable by a corresponding one of said transmitters.

6. A device as claimed in claim 1, further comprising a plurality of spaced transmitters stationarily mounted on the stator of the AC machine in operative proximity with said actuator and wherein said actuator comprises a disc having a reflecting multitrack code design thereon, each of the code tracks being scannable by a corresponding one of said transmitters.

7. A device as claimed in claim 1, wherein the AC machine is a four-phase AC voltage machine having four phase windings, said actuator comprises a nonmetal disc having a metal strip thereon extending over a central angle of 180°, and each of said transmitters comprises an inductive approach switch, said transmitters being displaced 90° from each other.

8. A device as claimed in claim 7, wherein the control means comprises a pair of inverters each having an output and an input connected to a corresponding one of said inductive approach switches, and four AND gates each having an input connected to the output of an inverter and an output connected to the control electrode of a corresponding one of said electronic switches.

9. A device as claimed in claim 7, wherein said common output means includes an amplifier having an input and a plurality of variable resistors each connected to one end in common to the input of said amplifier and at the other end to the output of a corresponding one of said electronic switches.

10. A device as claimed in claim 7, wherein said control means provides a switch-off delay.

11. A device as claimed in claim 7, wherein two of the four phase windings of the AC machine are displaced 180° from each other and are connected in series in opposed polarities and said common output means includes a plurality of resistors and a difference amplifier having inputs connected to the series-connected phase windings via corresponding ones of said resistors and corresponding ones of said electronic switches.